No. 611,275. Patented Sept. 27, 1898.
J. A. RECTOR.
CREAMING CAN.
(Application filed Sept. 13, 1897.)
(No Model.)
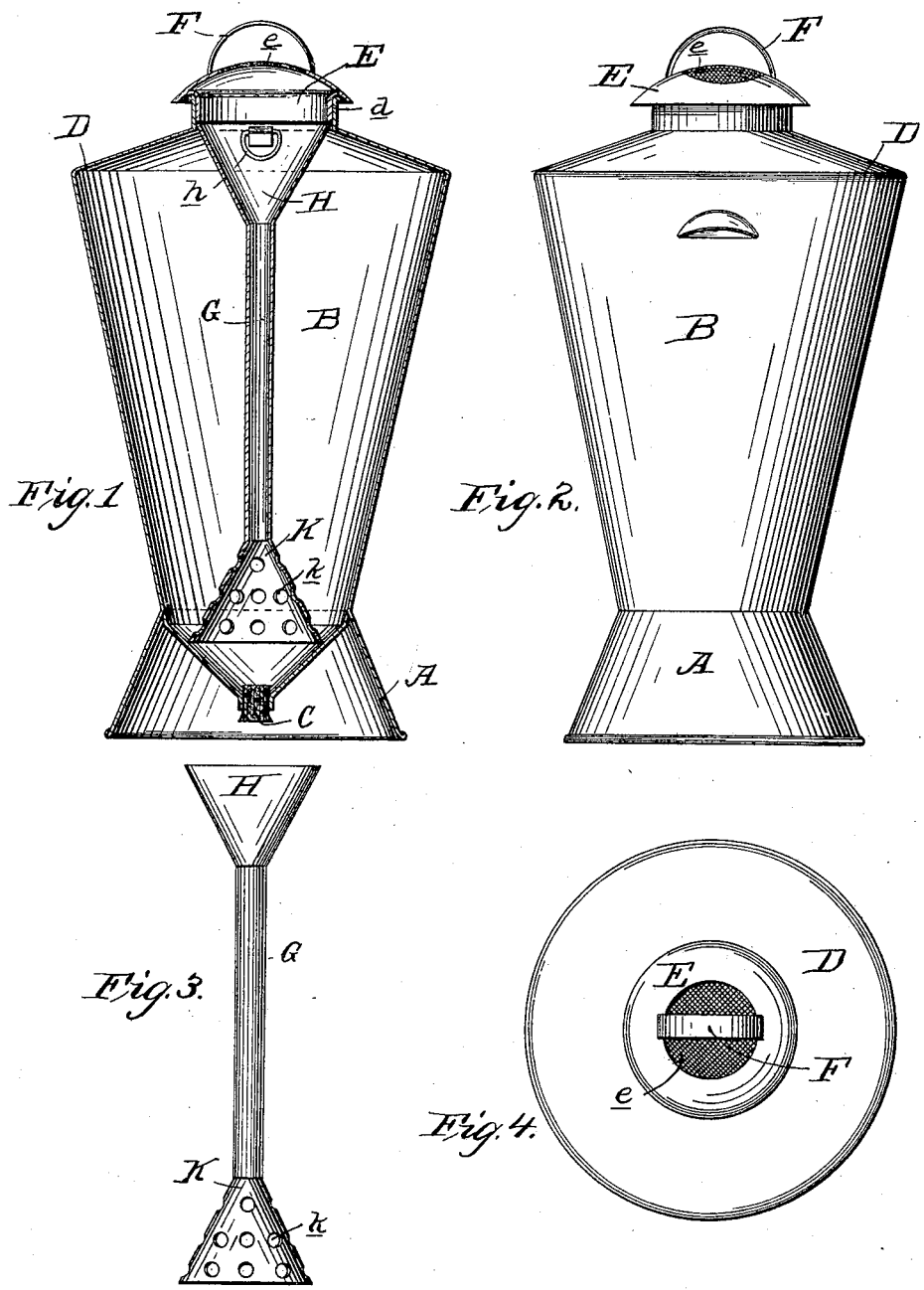
Witnesses:
J. H. Milans
A. S. Bacon
Inventor:
James A. Rector,
By M. Dorian
Att'y.

UNITED STATES PATENT OFFICE.

JAMES A. RECTOR, OF LANCASTER, MISSOURI.

CREAMING-CAN.

SPECIFICATION forming part of Letters Patent No. 611,275, dated September 27, 1898.

Application filed September 13, 1897. Serial No. 651,454. (No model.)

*To all whom it may concern:*

Be it known that I, JAMES A. RECTOR, a citizen of the United States, residing at Lancaster, in the county of Schuyler and State of Missouri, have invented certain new and useful Improvements in Creaming-Cans; and I do hereby declare the following to be a full, clear, and exact description of the invention, such as will enable others skilled in the art to which it appertains to make and use the same.

This invention relates to an improvement in creaming-cans, and it is embodied in the construction and combination of parts hereinafter described, and definitely pointed out in the claim.

The invention is designed more particularly for domestic use, although it may be used in creameries or other manufacturing establishments; and its object is to provide a device whereby a cooling and separating liquid may be introduced into the can at points below the level of the lighter particles of the milk or cream and which will be compact, simple in construction, and readily operated.

In the drawings, Figure 1 represents a vertical central section of the improved can. Fig. 2 is an elevation, and Fig 3 is a detail view of the conductor. Fig. 4 is a top plan view of the can.

A designates the base-flange of the can, and B the sides, which taper outward from the supporting-flange upward. The bottom of the can is formed conical and is provided with a discharge-opening at the apex, which opening is provided with a suitable valve or stopper C. The top of the can D is inclined and is formed with the neck $d$, surrounding a supply-opening of the top. This neck is provided with a removable cap E, having a central perforated section $e$, preferably of fine wire-gauze, over which is extended a handle and protector F.

G represents a conductor-tube having an inverted conical upper end, forming a funnel H, which is provided at one side with a handle or bail $h$. The lower end of the tube G is provided with a conical extension K, having its sides perforated, as at $k$. This portion I preferably term a "distributing-head," and it is designed to rest on the conical bottom of the can, forming a chamber between.

In operation the milk is first placed in the can. The distributing device is then inserted. Water of low temperature is afterward introduced into the funnel at the top of the distributer. The water, being cold, immediately settles to the bottom, and being distributed regularly through the apertures of the distributing-head of the distributer, rises through the bottom of the can, carrying the particles of cream upward, while the blue milk is assimilated, the cream floating on the top. The milk is allowed to stand in this condition for a few moments, and the water and blue milk are then drawn off through the opening in the bottom of the can, leaving the cream in the can, from which it may be drawn at any time through the bottom opening.

I have found that cream can be separated from the milk very rapidly by this means and with but little trouble, the animal heat of the milk passing off through the perforated top.

I am aware that the special arrangement shown and described can be varied or altered as to shape and details without departing from the nature and principle of my invention.

Having thus described the invention, what is claimed, and desired to be secured by Letters Patent, is—

In a creaming-can the combination with the can-body having a conical base formed with a discharge-opening in its apex, and a neck, of a distributing device located wholly within the can and consisting of a tube having a funnel-shaped upper end positioned in the neck and a perforated distributer at the lower end of the tube resting on the bottom, substantially as described.

In testimony whereof I affix my signature in presence of two witnesses.

JAMES A. RECTOR.

Witnesses:
 JOHN R. MAIZE,
 C. FIGGE.